(12) United States Patent
Hirose et al.

(10) Patent No.: US 11,488,416 B2
(45) Date of Patent: Nov. 1, 2022

(54) CERTIFICATE RECOGNITION SYSTEM, CERTIFICATE RECOGNITION METHOD, AND PROGRAM OF VERIFYING CERTIFICATE

(71) Applicants: Mitsunobu Hirose, Tokyo (JP); Reo Yonaga, Kanagawa (JP); TANIGUCHI MASAHITO, Tokyo (JP)

(72) Inventors: Mitsunobu Hirose, Tokyo (JP); Reo Yonaga, Kanagawa (JP)

(73) Assignee: Taniguchi Masahito, Tokyo (JP)

( * ) Notice: Subject to any disclaimer, the term of this patent is extended or adjusted under 35 U.S.C. 154(b) by 0 days.

(21) Appl. No.: 17/425,655

(22) PCT Filed: Jan. 25, 2019

(86) PCT No.: PCT/JP2019/002424
§ 371 (c)(1),
(2) Date: Jul. 23, 2021

(87) PCT Pub. No.: WO2020/152840
PCT Pub. Date: Jul. 30, 2020

(65) Prior Publication Data
US 2022/0044008 A1 Feb. 10, 2022

(51) Int. Cl.
*G06V 40/16* (2022.01)
*G06V 10/25* (2022.01)
*G06F 21/32* (2013.01)
(52) U.S. Cl.
CPC ............ *G06V 40/172* (2022.01); *G06F 21/32* (2013.01); *G06V 10/25* (2022.01); *G06V 40/169* (2022.01)

(58) Field of Classification Search
CPC .......... G06K 9/00288; G06K 9/00275; G06K 9/3233; G06F 21/32
See application file for complete search history.

(56) References Cited

U.S. PATENT DOCUMENTS 3,564,132 A * 2/1971 Baker ...................... G07C 9/27
348/156
3,805,238 A * 4/1974 Rothfjell ............... G09F 3/0286
382/118

(Continued)

FOREIGN PATENT DOCUMENTS

CN 103440482 A 12/2013
JP 2001338135 A 12/2001

(Continued)

OTHER PUBLICATIONS

International Search Report issued in PCT/JP2019/002424 dated Mar. 5, 2019.

*Primary Examiner* — Aaron W Carter
(74) *Attorney, Agent, or Firm* — Norton Rose Fulbright US LLP; James R. Crawford

(57) ABSTRACT

A system, a method, and a program that easily verify that a certificate with a photograph belongs to a user. The system that verifies that a certificate 1 with a photograph belongs to a user acquires a first image containing the certificate with the photograph of a user, judges the validity of the first image, acquires a second image containing the user and the certificate with a photograph that corresponds to the first image that has validity, judges if the user's face and the photograph of the certificate in the second image match, and certifies that the certificate with a photograph belongs to the user if the face and the photograph of the certificate match.

5 Claims, 9 Drawing Sheets

(56) References Cited

U.S. PATENT DOCUMENTS

| | | | | |
|---|---|---|---|---|
| 4,821,118 | A * | 4/1989 | Lafreniere | G06Q 20/40145 |
| | | | | 348/156 |
| 6,990,588 | B1 * | 1/2006 | Yasukura | H04L 9/006 |
| | | | | 713/186 |
| 10,452,897 | B1 * | 10/2019 | Benkreira | G06K 9/344 |
| 2010/0177939 | A1 * | 7/2010 | Hamada | G06K 9/00255 |
| | | | | 382/118 |
| 2010/0308108 | A1 * | 12/2010 | Choi | G07C 9/27 |
| | | | | 235/382 |
| 2013/0219480 | A1 * | 8/2013 | Bud | G06F 21/32 |
| | | | | 726/7 |
| 2018/0295249 | A1 * | 10/2018 | Murakami | H04N 1/00801 |
| 2019/0065874 | A1 * | 2/2019 | Gerard | G06K 9/00288 |
| 2019/0392196 | A1 * | 12/2019 | Sagonas | G06N 3/04 |
| 2020/0396220 | A1 * | 12/2020 | McKegney | H04L 63/0884 |
| 2021/0034862 | A1 * | 2/2021 | Thompson | G06K 9/00288 |
| 2021/0295017 | A1 * | 9/2021 | Aoyagi | G06K 9/00268 |
| 2022/0044008 | A1 * | 2/2022 | Hirose | G06V 40/169 |

FOREIGN PATENT DOCUMENTS

| | | | |
|---|---|---|---|
| JP | 2007323425 | A | 12/2007 |
| JP | 2008009617 | A | 1/2008 |
| JP | 2019003421 | A | 1/2019 |

* cited by examiner

CERTIFICATE RECOGNITION SYSTEM, CERTIFICATE RECOGNITION METHOD, AND PROGRAM OF VERIFYING CERTIFICATE

CROSS REFERENCE TO RELATED APPLICATIONS

This application is a national phase under 35 U.S.C. § 371 of International Application No. PCT/JP2019/002424 filed on Jan. 25, 2019, the entire contents of which is incorporated herein by reference in its entirety.

TECHNICAL FIELD

The present invention relates to a system, a method, and a program that verify that a certificate with a photograph belongs to a user.

BACKGROUND

Recently, technologies to confirm identification and verify a certificate provided have drawn attention since identity confirmation was tighten at different times, such as participation in an event, purchase of alcohol and cigarettes, access to a restaurant, contract on a mobile phone, etc., and opening of a bank account, As one example of such technologies, the technology that confirms identification by using a certificate with a photograph and a password (refer to Patent Document 1).

DOCUMENT IN THE EXISTING ART

Patent Document

Patent Document 1: JP 2007-323425 A

SUMMARY

However, technologies to counterfeit certificates are also being developed, and the mechanism that verifies certificates is socially needed. The composition of Patent Document 1 cannot judge if the person that inputs the password is the same as the one indicated by a certificate with a photograph and whether the certificate with a photograph is counterfeit or authentic. The composition hardly verifies if a certificate with a photograph belongs to a user.

An objective of the present invention provides a system, a method, and a program that easily verify that a certificate with a photograph belongs to a user.

The present invention provides a system that verifies that a certificate with a photograph belongs to a user, including:

a first acquisition unit that acquires a first image of the certificate imaged with the photograph of a user;

a first judgment unit that judges the validity of the first image;

a second acquisition unit that acquires a second image containing the user and the certificate with a photograph that corresponds to the first image that has validity;

a second judgment unit that judges if the user's face and the photograph of the certificate in the second image match; and a certifying unit that certifies that the certificate with a photograph belongs to the user if the face and the photograph of the certificate match.

According to the present invention, the system that verify that a certificate with a photograph belongs to a user acquires a first image containing the certificate with the photograph of a user, judges the validity of the first image, acquires a second image containing the user and the certificate with a photograph that corresponds to the first image that has validity, judges if the user's face and the photograph of the certificate in the second image match, and certifies that the certificate with a photograph belongs to the user if the face and the photograph of the certificate match.

The present invention is the category of a system, but the categories of a method, a program, etc. have similar functions and effects.

The present invention can provide a system, a method, and a program that easily verify that a certificate with a photograph belongs to a user.

DETAILED DESCRIPTION

Embodiments of the present invention will be described below with reference to the attached drawings. However, this is illustrative only, and the technological scope of the present invention is not limited thereto.

Overview of System for Verifying a Certificate 1

Figure 1:
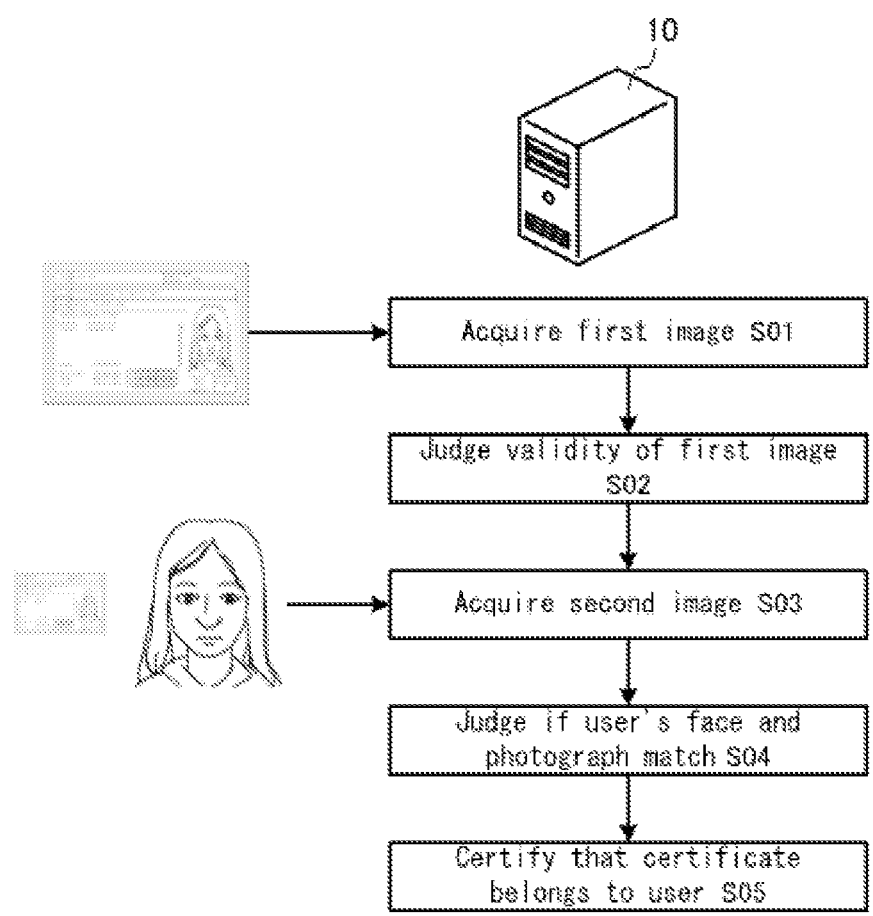
FIG. 1 is a schematic diagram of the system for verifying a certificate 1.

A preferable embodiment of the present invention is described below with reference to FIG. 1. FIG. 1 shows an overview of the system for verifying a certificate 1 according to a preferable embodiment of the present invention. The system for verifying a certificate 1 includes a computer 10, which is the computer system that verifies that a certificate with a photograph belongs to a user.

The system for verifying a certificate 1 may include a distributed ledger, a user terminal (e.g., smart phone, tablet terminal) owned by a user, and a Near Field Communication (hereinafter referred to as "NFC") tag. For example, the system for verifying a certificate 1 may be achieved with one computer such as a computer 10 or with two or more computers such as cloud computers.

The distributed ledger is achieved by the distributed ledger technology, which is managed and shared with nodes. The distributed ledger records data as one ledger or data as a strung block. The ledger or the block is shared with nodes.

The computer 10 is data-communicatively connected with a user terminal, an NFC tag, nodes through a public line network, etc., which transceives necessary data.

The computer 10 acquires a first image such as a moving or still image containing the user's certificate with a photograph from a user terminal, etc. For example, the certificate with a photograph is a driver's license, a passport, a basic residential registry card with a photograph, a my-number card, a student identification card, a residence card, or a physical disability certificate. For example, the user takes a first image to contain the certificate with a photograph with an imaging device of the user terminal and sends the first image to the computer 10. The computer 10 acquires the first image by receiving the first image transmitted from the user terminal The computer 10 may also acquire a third image such as a moving or still image containing the user's different certificate with a photograph according to the detail of a transaction. The detail of a transaction has the possibility of being used for crimes relating to, for example, acquisition of a residence certificate, opening of a bank account, and contract of a mobile phone. In this case, the third image is processed in a similar way to the first image when the first image is processed as described below.

The computer 10 judges the validity of the first image. The computer 10 extracts the feature points (e.g., shape, outline, hue) and the feature amounts (e.g., statistics such as the average, decentralization, and histogram of pixel values) of the first image by image analysis. The computer 10 recognizes character strings by character recognition. The computer 10 identifies the format (e.g., layout, font, shape, size) of the certificate with a photograph in the first image based on the extracted feature points and feature amounts, and the recognized character strings. The computer 10 judges the validity of the certificate with a photograph in the first image based on this identified format.

If the computer 10 acquires a plurality of first images contains a different type of certificate with a photograph, the computer 10 judges the validity as described above for each of the first images.

If the computer 10 judges that the first image has validity, the computer 10 acquires a second image such as a moving or still image containing the user and the certificate with a photograph that corresponds to the first image. For example, the user takes a second image to contain the user's face and the certificate with a photograph with the imaging device of the user terminal and sends the second image to the computer 10. The computer 10 acquires the second image by receiving the second image transmitted from the user terminal.

If the computer 10 acquires a plurality of first images, the computer 10 acquires one or more second images containing the user and the certificate with a photograph that corresponds to the first image that has validity. At this time, the computer 10 may acquire a plurality of second images containing the user and a different certificate with a photograph or one second image containing the user and two or more certificates with a photograph.

The computer 10 may acquire second images such as moving or still images containing the user and the certificate with a photograph that were imaged at two or more different angles. In this case, the user takes a plurality of second images to contain the user and one certificate with a photograph that were imaged at different angles with the user terminal and sends the second images to the computer 10. The computer 10 acquires the second images by receiving the second images transmitted from the user terminal.

The computer 10 judges if the user's face and the photograph of the certificate in the second image match. The computer 10 extracts the feature points and the feature amounts of the second image by image analysis and judges if the user's face and the photograph of the certificate in the second image match based on the extracted feature points and feature amounts.

If the computer 10 acquires a plurality of first images, the computer 10 judges if the user's face and the photograph of the certificate in the second image corresponding to each of the first images match.

If the computer 10 acquires a plurality of second images taken from two or more different angles, the computer 10 judges the user's face and the photograph of the certificate in the second images taken from all the angles match.

If the computer 10 particularly acquires a moving image as the second image, the computer 10 may also judge the presence or absence of a user's biological reaction (e.g., response, gesture, voice, movement) in the second image.

If the user's face and the photograph match as the judgement result, the computer 10 certifies that the certificate with a photograph contained in the second image belongs to the user.

In the case of the addition of the biological reaction, if the user's face and the photograph in the second image match in addition to the presence of a biological reaction, the computer 10 certifies that the certificate with a photograph contained in the second image belongs to the user. This makes it more difficult to abuse the certificate, compared with simple comparison between still images.

The computer 10 can record the verification result in a distributed ledger to provide to third parties (e.g., companies, stores, facilities). This makes it easy to provide the verification result that cannot be manipulated to third parties based on the recorded distributed ledger. In addition, the third parties easily identify a user by acquiring the verification result while the user easily saves many steps for personal identification.

The overview of the process that the system for verifying a certificate 1 performs is described below.

The computer 10 acquires a first image such as a moving or still image containing the user's certificate with a photograph (Step 01). The user takes a first image to contain a certificate with a photograph and sends the first image to the computer 10. The computer 10 acquires the first image taken by the user by receiving the first image transmitted from the user terminal.

The computer 10 judges the validity of the first image (Step S02). The computer 10 extracts the feature points and the feature amounts of the first image by image analysis. The computer 10 recognizes character strings in the first image by character recognition. The computer 10 identifies the type and the format of the certificate with a photograph in the first image based on the extracted feature points and feature amounts, and the recognized character strings. The computer 10 identifies the type of the certificate with a photograph as the result of character recognition of the first image. The computer 10 identifies specific character strings (e.g., identifiable types such as "driver's license," "basic residential registry card," "my-number card") in the certificate with a photograph to identify the type of this certificate. The computer 10 identifies the format of the certificate with a photograph based on the identified type of the certificate with a photograph. The computer 10 compares the format identified based on the type with that identified based on the extracted feature points and feature amounts to judge the validity of the certificate with a photograph.

If the computer 10 judges that the first image has validity, the computer 10 acquires a second image such as a moving or still image containing the user and the certificate with a photograph that corresponds to the first image (Step S03).

For example, the user uses the user terminal to take a second image to contain the user (at least the user's face) and the certificate with a photograph and send the second image to the computer 10. The computer 10 acquires the second image taken by the user by receiving the second image transmitted from the user terminal. For example, the computer 10 transmits a message, etc., to prompt the user to take an image to contain the user and the certificate with a photograph to the user terminal that transmitted the first image. The user takes the second image by receiving the message.

The computer 10 judges if the user's face and the photograph of the certificate in the second image match (Step S04). The computer 10 extracts the feature points and the feature amounts of the second image by image analysis. The computer 10 identifies the user's face and the photograph of the certificate based on the extracted feature points and feature amounts. The computer 10 judges if these faces match.

If the user's face and the photograph of the certificate match, the computer 10 certifies that the certificate with a photograph contained in the second image belongs to the user (Step S05). The computer 10 certifies the user's face, name, date of birth, age, sex, address, etc., described in the certificate with a photograph.

System Configuration of System for Verifying a Certificate 1

Figure 2:
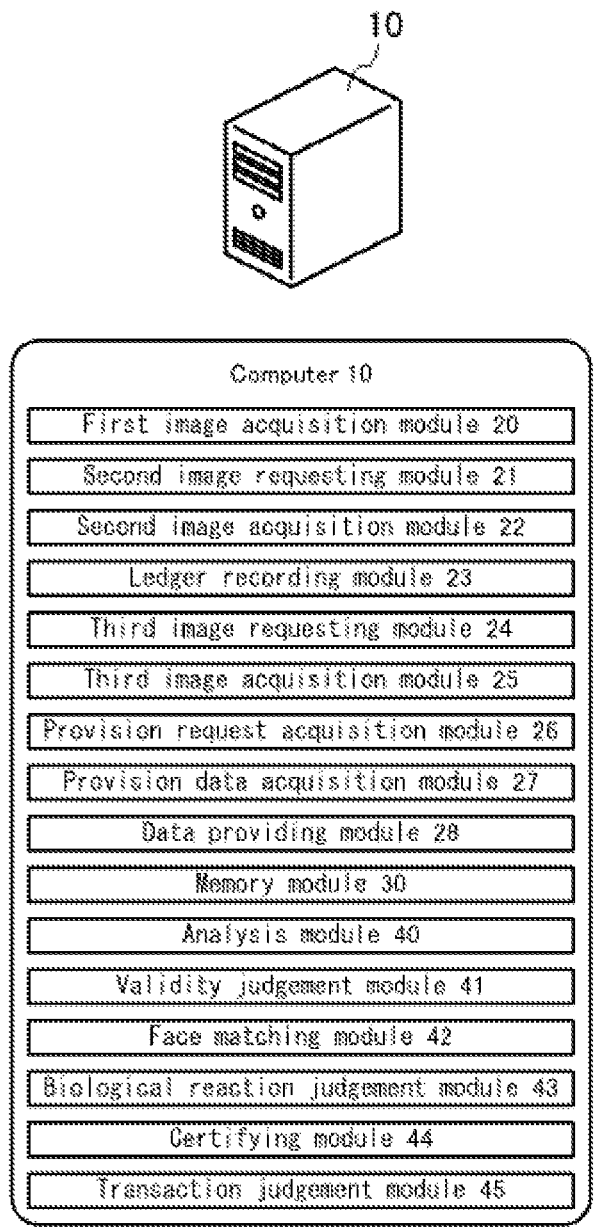
FIG. 2 is an overall configuration diagram of the system for verifying a certificate 1.

A system configuration of the system for verifying a certificate 1 according to a preferable embodiment is described below with reference to FIG. 2. FIG. 2 shows a block diagram illustrating the system for verifying a certificate 1 according to a preferable embodiment of the present invention. In FIG. 2, the system for verifying a certificate 1 includes a computer 10, which is the computer system that certifies that a certificate with a photograph belongs to a user.

The computer 10 is data-communicatively connected with a user terminal, an NFC tag, nodes through a public line network, etc., which transceives necessary data.

The system for verifying a certificate 1 may include a user terminal, an NFC tag, nodes, and other terminals and devices that are not shown in the drawings. For example, the system for verifying a certificate 1 may be achieved with one computer such as a computer 10 or with two or more computers such as cloud computers.

The computer 10 includes a central processing unit (hereinafter referred to as "CPU"), a random access memory (hereinafter referred to as "RAM"), and a read only memory (hereinafter referred to as "ROM"); and a communication unit such as a device that is capable to communicate with other terminals and devices, for example, a Wireless Fidelity or Wi-Fi® enabled device complying with IEEE 802.11. The computer 10 also includes a memory unit such as a hard disk, a semiconductor memory, a record medium, or a memory card to store data. The computer 10 also includes a processing unit provided with various devices that perform various processes.

Furthermore, in the computer 10, the control unit reads a predetermined program to achieve a first image acquisition module 20, a second image requesting module 21, a second image acquisition module 22, a ledger recording module 23, a third image requesting module 24, a third image acquisition module 25, a provision request acquisition module 26, a provision data acquisition module 27, and a data providing module 28 in cooperation with the communication unit. Furthermore, in the computer 10, the control unit reads a predetermined program to achieve a memory module 30 in cooperation with the memory unit. Furthermore, in the computer 10, the control unit reads a predetermined program to achieve an analysis module 40, a validity judgement module 41, a face matching module 42, a biological reaction judgement module 43, a certifying module 44, and a transaction judgement module 45 in cooperation with the processing unit.

First Certificate Verification Process

Figure 3:
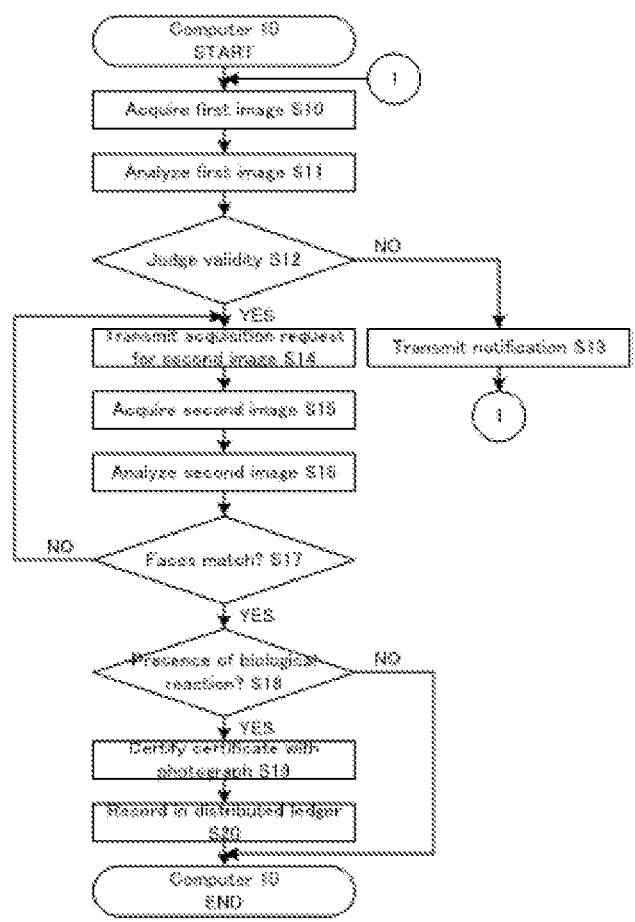
FIG. 3 is a flow chart illustrating the first certificate verification process performed by the computer 10.

The first certificate verification process performed by the system for verifying a certificate 1 is described below with reference to FIG. 3. FIG. 3 is a flow chart illustrating the first certificate verification process performed by the computer 10. The tasks executed by the modules will be described below with this process.

The first image acquisition module 20 acquires a first image such as a moving or still image containing the user's certificate with a photograph (Step 10). In Step 10, the first image acquisition module 20 acquires the certificate with a photograph, the image of which was taken by the user took with a user terminal as a first image. At this time, the user takes the first image to contain a certificate with a photograph with an imaging device (also including an app for taking an image) of the user terminal. The user terminal transmits the first image and the user's identifier (information that can uniquely identify the user, such as a predetermined ID, a name, the MAC address of a user terminal) to the computer 10 as the first image data. The data acquisition module 20 receives the first image data. As the result, the computer 10 acquires the first image and the identifier of the user who sent the first image. Examples of the certificate with a photograph are described above.

The analysis module 40 analyzes the first image (Step S11). In the step S11, the analysis module 40 extracts the feature points or the feature amounts of the first image by image analysis. The analysis module 40 recognizes character strings in the first image by character recognition. The analysis module 40 identifies the type and the format of the certificate with a photograph that is contained in the first image based on the analysis result. For example, the analysis module 40 recognizes the specific character strings (e.g., identifiable character strings for the types, such as "driver's license," "basic residential registry card," "my-number card") contained in the certificate with a photograph based on the result of the character recognition. The analysis module 40 identifies the type of the certificate with a photograph based on the recognized specific character string. The analysis module 40 also identifies other character strings (e.g., a name, the date of birth, an address, the date of issuance, a valid period, a number with a predetermined digits, and the name of the deliverer) contained in the certificate with a photograph and the formats of these character strings. The analysis module 40 also identifies the layout, the shape, the size, etc., of the certificate with a photograph based on the extracted feature points and feature amounts. The analysis module 40 also appropriately identifies other contents by other analysis methods.

Figure 8:
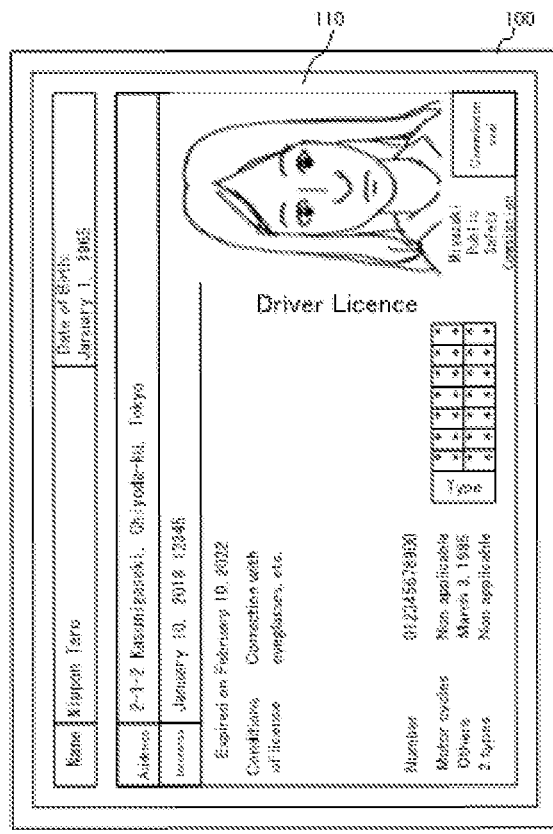
FIG. 8 schematically shows one example of the first image.

The first image analysis that the analysis module 40 performs is described below with reference to FIG. 8. FIG. 8 schematically shows one example of the first image. In FIG. 8, the first image 100 contains a certificate with a photograph 110. The analysis module 40 identifies "Driver's license" as a specific character string by analyzing the first image 100. The analysis module 40 also identifies "Nippon Taro" for "Name," "Jan. 1, 1965" for "Date of birth," "2-1-2 Kasumigaseki, Chiyoda-ku, Tokyo" for "Address," "Jan. 10, 2018" for "Date of issuance," "012345678900" for "Number of a predetermined digits," and "Miyazaki Public Safety Commission" for "Name of deliverer" as other character strings. The analysis module 40 also identifies the font of the character strings. The analysis module 40 also identifies the face, the layout, the shape, the size, etc., of the photograph of the certificate by analysis. For example, the analysis module 40 identifies the location, the order, the alignment, the frame, the blank, etc., of the face of the photograph, the name, the date of birth, the address, and the date of the issuance, number with predetermined digits as the layout. For example, the analysis module 40 also identifies the outline as the shape. For example, the analysis module 40 also identifies the aspect ratio and the area as the size.

The validity judgement module 41 judges the validity of the first image based on the type and the format of the identified certificate with a photograph contained in the first image (Step S12). In Step S12, the validity judgement module 41 judges the validity of the first image based on the certificate database that associates the type with the format of the certificate with a photograph that the memory module 30 previously records. The validity judgement module 41 judges the validity of the certificate with a photograph contained in the first image by comparing the type and format of the certificate that the analysis module 40 identified with the certificate database. The validity judgement module 41 identifies the format of the certificate with a photograph that is associated in the certificate database based on the type of the certificate that the analysis module 40 identified. The validity judgement module 41 judges if the identified format of the certificate as the analysis result matches that associated with the type of this certificate recorded in the certificate database.

In the above-mentioned steps S10 to S12, the computer 10 acquires one first image but may acquire a plurality of first images. In this case, the first image acquisition module 20 acquires a plurality of first images by a process similar to Step S10. The analysis module 40 performs a process similar to Step S11 for the first images to identify the type and the format of the certificate with a photograph contained in the first images. The validity judgement module 41 performs a process similar to Step S12 for the first images to judge the validity of the first images.

In Step S12, if the validity judgement module 41 judges that the certificate with a photograph that is contained in the first image has no validity (Step S12, NO), specifically, if the formats do not match (additionally, if the analytical result was not satisfactorily received from the analysis module 40, for example, if no certificate with a photograph is contained in the first image, if only part of a certificate with a photograph is contained in the first image, or if the type or the format could not be identified because of a blurry image), the first image acquisition module 20 transmits a notification to the user terminal to prompt the user to take an image of the certificate with a photograph again (Step S13). In Step S13, the first image acquisition module 20 identifies the user's user terminal based on the user's identifier contained in the first image data and transmits the notification to the identified user terminal. Examples of the notification include a message suggesting no validity, a message prompting the user to take the first image of the certificate with a photograph again, a message transmitting the taken first image to the computer 10, and a start command to activate the imaging device (or the application for taking an image). The first image acquisition module 20 has the user terminal display the notification (by having the user terminal display the above-mentioned message and/or activate the imaging device). For example, if only a part of the certificate with a photograph is contained, the first image acquisition module 20 transmits a message instructing take an image of the entire certificate with a photograph to the user terminal to have the user terminal display this message. As the result, the computer 10 will perform the process of the above-mentioned step S10 again.

If the computer 10 judges that the reacquired first image has no validity, the computer 10 ends this process. This explanation is omitted from the drawings to simplify the description.

If the computer 10 receives a plurality of first images, the validity judgement module 41 performs the above-mentioned step S13 for the first image that has no validity.

On the other hand, in Step S12, if the validity judgement module 41 judges that the certificate with a photograph contained in the first image has validity (Step S12, YES), specifically, if the formats match, the second image requesting module 21 transmits an acquisition request to the user terminal to acquire the second image such as a moving or still image containing the user and the certificate with a photograph that corresponds to the first image (Step S14). In Step S14, the second image acquisition module 21 identifies the user terminal to receive the acquisition request based on the user's identifier contained in the first image data and transmits an acquisition request to the identified user terminal. Examples of the acquisition request include a message prompting the user to take an image to contain the user and the certificate with a photograph contained in the first image and/or a start command to activate the imaging device. The second image acquisition module 21 has the user terminal display the notification based on the acquisition request (by having the user terminal display the above-mentioned message and/or activate the imaging device).

The process of the above-mentioned steps S10 to S14 can be omitted. In this case, the analysis module 40 only has to perform the process of the above-mentioned steps S11 and S12 when processing the step S16 described later. Specifically, the analysis module 40 performs the image analysis, the character recognition, etc., to identify the type and the format of the certificate with a photograph contained in the second image when analyzing the second image. The validity judgement module 41 judges the validity of the certificate with a photograph by comparing the type and format of the identified certificate with the certificate database. If the validity judgement module 41 judges that the certificate with a photograph has validity, the validity judgement module 41 only has to perform the process of the step S17 described later. On the other hand, if the validity judgement module 41 judges that the certificate with a photograph has no validity (for example, if the judgement is hardly made because the analysis module 40 cannot perform the analysis enough due to the size and the resolution of the certificate with a photograph), the first image acquisition module 20 transmits the notification prompting the user to take the first image to the user terminal. Examples of the notification are similar to the notification processed in the above-mentioned step S13, including a message prompting the user to take the first image, a message transmitting the taken first image to the computer 10, and a command to activate the imaging device. The first image acquisition module 20 has the user terminal display the notification (by having the user terminal display the above-mentioned message and/or activate the imaging device). As the result, the computer 10 will perform the process of the above-mentioned step S10.

The user takes a second image to contain the user and the certificate with a photograph based on the acquisition request with the imaging device of the user terminal. The user terminal transmits the taken second image and the user's identifier to the computer 10 as the second image data.

The second image acquisition module 22 acquires the second image such as a moving or still image containing the user and the certificate with a photograph that corresponds to the first image (Step S15). In Step S15, the second image acquisition module 22 receives the second image data transmitted from the user terminal. As the result, the computer 10 acquires the second image and the identifier of the user who sent the second image.

The analysis module 40 analyzes the second image (Step S16). In the step S16, the analysis module 40 extracts the feature points or the feature amounts of the second image by image analysis. The analysis module 40 identifies the user's face and the photograph of the certificate based on the extracted feature points and feature amounts. The analysis module 40 identifies the positions of the eyes, the nose, the oral ends, etc., of the identified user's face and the photograph of the certificate. The analysis module 40 also identifies the movement, etc., of the user based on the extracted feature points and feature amounts if the second image is a moving image. The analysis module 40 also identifies the user's voice by performing voice recognition for the voice made by the user if the second image is a moving image.

Figure 9:
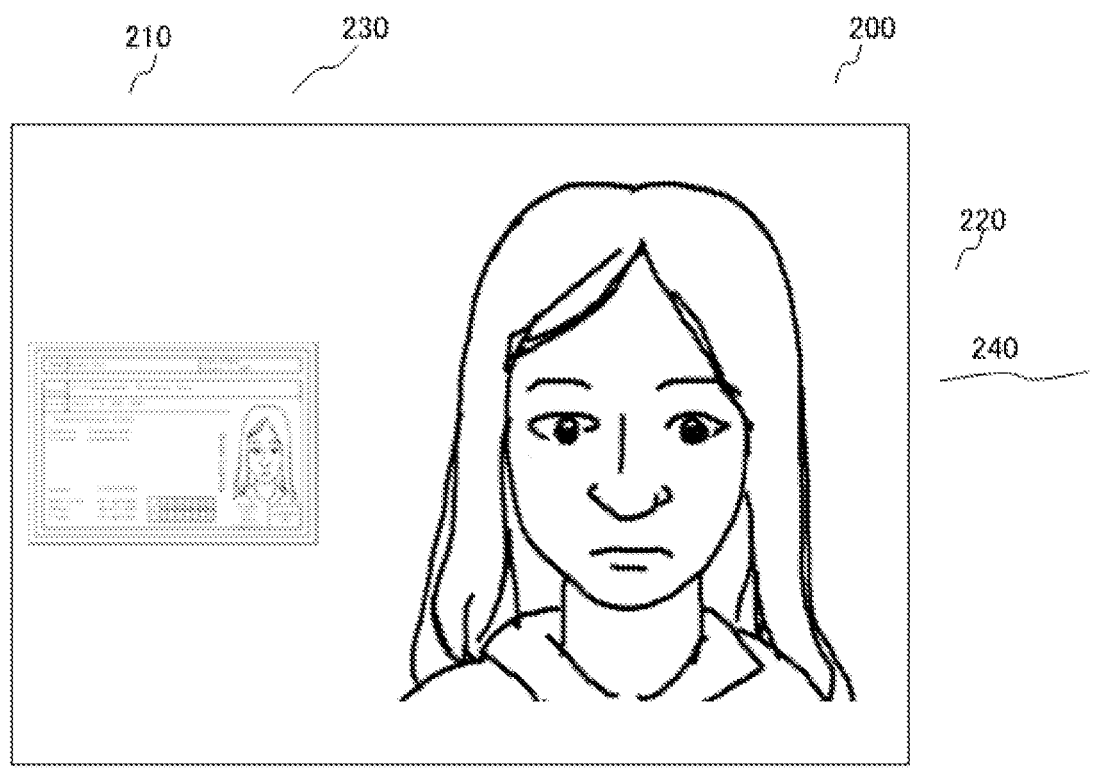
FIG. 9 schematically shows one example of the second image.

The image analysis of the second image that the analysis module 40 performs is described below with reference to FIG. 9. FIG. 9 schematically shows one example of the second image. In FIG. 9, the second image 200 contains a certificate with a photograph 210 and a user 220. The analysis module 40 identifies the user's face 240 and the face of the photograph 230 of the certificate 210 by analyzing this second image. The analysis module 40 identifies the positions of the eyes, the nose, the oral ends, etc., of the face of the photograph 230. The analysis module 40 also identifies the positions of the eyes, the nose, the oral ends, etc., of the user's face 240.

The face matching module 42 judges if the user's face and the photograph of the certificate in the second image match (Step S17). In Step S17, the face matching module 42 judges if the positions of the identified eyes, nose, oral ends, etc., of the face of the photograph 230 and the user's face 240 match by comparing these. At this time, the face matching module 42 compares the parts of the face in addition to the ratio of the size of the identified face of the photograph 230 to the size of user's face 240.

In Step S17, if the face matching module 42 judges that the faces do not match (Step S17, NO), the second image requesting module 21 performs the above-mentioned step S14 again. At this time, the second image requesting module 21 contains the reason because the faces do not match, the resolution of the image is incorrect, or the image is unclear in the message prompting the user to take an image to contain the user and the certificate with a photograph.

In the above-mentioned steps S15 to S17, the computer 10 acquires one second image but may acquire a plurality of second images. In this case, the second image acquisition module 22 may acquire a plurality of second images corresponding to one and/or a plurality of first images that has validity.

For example, if the second image acquisition module 22 acquires a plurality of second images corresponding to a plurality of first images, the computer 10 performs the process of the above-mentioned steps S15 to S17 for the second images. If the computer 10 judges that the user's face and the photographs of the certificates in the second images match, the computer 10 performs the process of the step S18 described later. The computer 10 performs the process of the above-mentioned step S14 again for the second images with the user's face and the photograph that do not match.

For example, if the second image acquisition module 22 acquires a plurality of second images corresponding to one first image, the second image acquisition module 22 acquires second images containing the user and the certificate with a photograph contained in the first image that were imaged at two or more different angles. In this case, the computer 10 performs the process of the above-mentioned steps S15 to S17 for the second images. If the computer 10 judges that the user's face and the photographs of the certificates in the second images match at all the angles, the computer 10 performs the process of the step S18 described later. The computer 10 performs the process of the above-mentioned step S14 again for the second images with the user's face and the photograph that were taken at an angle but do not match. Alternatively, the computer 10 requests a second image taken at an angle other than the angle at which the face and the photograph do not much in the process of the step S14.

On the other hand, in Step S17, if the face matching module 42 judges that the face and the photograph match (Step S17, YES), the biological reaction judgement module 43 judges the presence or absence of a user's biological reaction (e.g., response, gesture, voice, movement) in the second image (step S18). In Step S18, if the second image is a moving image based on the analysis result from the analysis module 40, the biological reaction judgement module 43 judges the presence or absence of a biological reaction corresponding to a message showing a predetermined biological reaction that is previously set or is contained in an acquisition request.

The step S18 can be skipped. For example, if the second image is a still image, this process is skipped. Even if the second image is a moving image, this process is skipped. If the process of the step S18 is skipped, the computer 10 performs the process of the step S19 described later after the process of the step S17.

In Step S18, if the biological reaction judgement module 43 judges that there is no biological reaction (Step S18, NO), the computer 10 ends this process. The computer 10 may perform the process of the above-mentioned step S14. At this time, the second image requesting module 21 may include the message prompting the user to have a predetermined biological reaction in an acquisition request.

On the other hand, in Step S18, if the biological reaction judgement module 43 judges that there is a biological reaction (Step S18, YES), the certifying module 44 certifies that the certificate with a photograph belongs to the user (Step S19). In Step S19, the certifying module 44 certifies that the certificate with a photograph acquired as the first image belongs to the user. In addition to the certifying, the certifying module 44 issues the user's identifier contained in the acquired first image data and second image data as well as the user's face, name, date of birth, age, sex, address, etc., attached to or described in the certificate with a photograph that have been identified based on the analysis result, as certified data.

The computer 10 may acquire a plurality of first images to increase the reliability of the verification depending on the number of the user's faces matching with the photographs of the certificate in addition to the presence of a biological reaction (or the number of the faces matching with the photographs of the certificate if the process for the biological reaction is skipped) based on the result of the process of the steps S17 and S18 for the second images each corresponding to the first images. For example, the reliability herein means that the user's face and the photograph of the certificate are at least the same if each of the certificates with a photograph has a different date of issue. The higher reliability is, the more the present situation of the user matches this certified data. Specifically, the higher reliability is, the more the present situation of the user is fit. The certification with a higher reliability is easily used for more rigorous identification procedures of, for example, acquisition of a residence certificate, opening of a bank account, and contract of a mobile phone that have the possibility of being used for crimes.

The ledger recording module 23 records the verification result in a distributed ledger (Step S20). In Step S20, the ledger recording module 23 records the verification result showing that the certificate with a photograph contained in the first image and the second image belongs to the user and the certified data in a distributed ledger as the verification result based on the above-mentioned distributed ledger technology.

Second Certificate Verification Process

Figure 4:
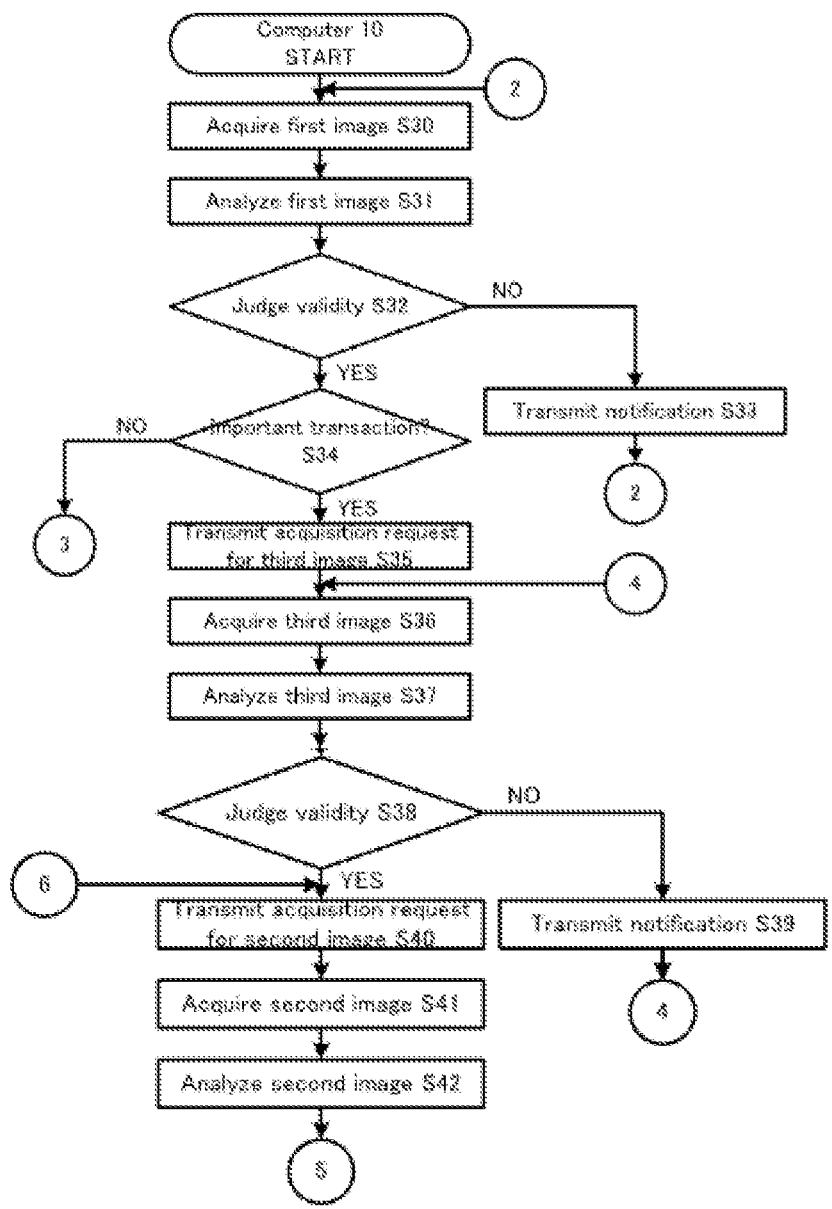
FIG. 4 is a flow chart illustrating the second certificate verification process performed by the computer 10.
Figure 5:
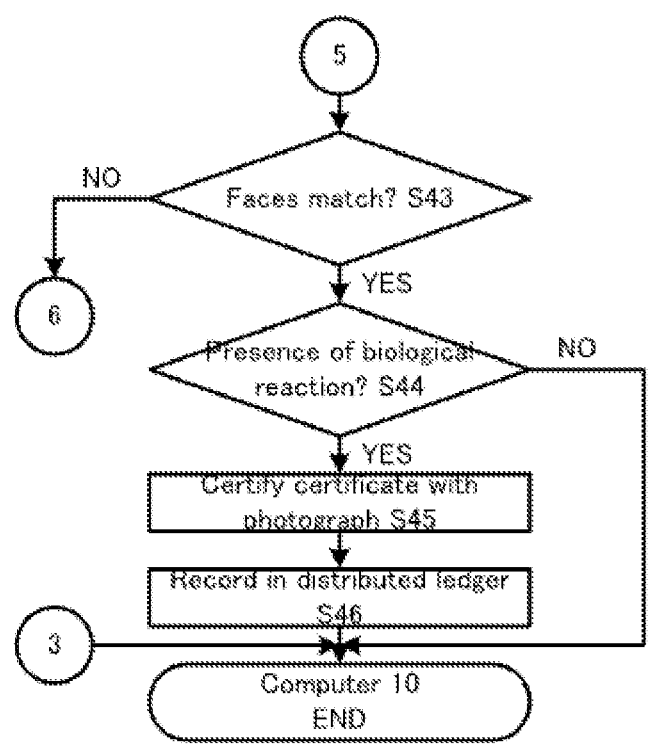
FIG. 5 is a flow chart illustrating the second certificate verification process performed by the computer 10.

The second certificate verification process performed by the system for verifying a certificate 1 is described below with reference to FIGS. 4 and 5. FIGS. 4 and 5 are flow charts illustrating the second certificate verification process performed by the computer 10. The tasks executed by the modules will be described below with this process. The detailed explanation of the tasks same as those of the above-mentioned first certificate verification process are omitted.

The first acquisition module 20 acquires the first image (Step S30). The step S30 is processed in the same way as the above-mentioned step S10.

The analysis module 40 analyzes the first image (Step S31). The step S31 is processed in the same way as the above-mentioned step S11.

The validity judgement module 41 judges the validity of the first image (Step S32). The step S32 is processed in the same way as the above-mentioned step S12.

In Step S32, if the validity judgement module 41 judges that the first image has no validity (Step S32, NO), the first image acquisition module 20 transmits a notification prompting the user to take an image of the certificate with a photograph again to the user terminal (Step S33). The step S33 is processed in the same way as the above-mentioned step S13.

On the other hand, in Step S32, if the validity judgement module 41 judges that the first image has validity (Step S32, YES), the transaction judgement module 45 judges if the transaction is important (Step S34). In Step S34, the transaction judgement module 45 previously acquires the content of the transaction that uses the verification result of the certificate with a photograph from the user and judges if the transaction is important. For example, the important transaction has the possibility of being used for crimes. Examples of the important transaction include acquisition of a residence certificate, opening of a bank account, and contract of a mobile phone.

The process of the above-mentioned step S34 may be performed before the above-mentioned step S30. In this case, the process of the step S35 described later only has to be performed after the above-mentioned step S32.

In Step S34, if the transaction judgement module 45 judges that the transaction is not important (Step S34, NO), the computer 10 performs the process of the above-mentioned step S14. In this case, the description herein and the attached drawings explain that the process is ended to simplify the description.

On the other hand, in Step S34, the transaction judgement module 45 judges that the transaction is important (Step S34, YES), the third image requesting module 24 transmits an acquisition request to the user terminal to acquire a third image such as a moving or still image containing a certificate with a photograph that is different from that contained in the first image (Step S35). In Step S35, the third image acquisition module 24 identifies the user terminal to receive the acquisition request based on the user's identifier contained in the first image data and transmits an acquisition request to the identified user terminal to acquire a third image. Examples of the acquisition request include a message prompting the user to take an image to contain a certificate with a photograph that is different from that contained in the first image and/or a start command to activate the imaging device. The third image acquisition module 24 has the user terminal display the notification based on the acquisition result (by having the user terminal display the above-mentioned message and/or activate the imaging device).

The user takes an image of the certificate with a photograph as a third image based on the acquisition request with the imaging device of the user terminal. The user terminal transmits the taken third image and the user's identifier to the computer 10 as the third image data.

The third image acquisition module 25 acquires the third image containing a certificate with a photograph that is different from that contained in the first image (Step S36). In Step S36, the third image acquisition module 25 receives the third image data transmitted from the user terminal. As the result, the computer 10 acquires the third image and the identifier of the user who sent the third image.

The analysis module 40 analyzes the third image (Step S37). The step S37 is processed in the same way as the above-mentioned step S11.

The validity judgement module 41 judges the validity of the third image (Step S38). The step S38 is processed in the same way as the above-mentioned step S12.

In Step S38, if the validity judgement module 41 judges that the first image has no validity (Step S38, NO), the third image requesting module 24 transmits a notification prompting the user to take an image of a certificate with a photograph that is different from that contained in the first image again to the user terminal (Step S39). The step S39 is processed in the same way as the above-mentioned step S13 to transmit the notification prompting the user to take a third image instead of the first image to the user terminal.

On the other hand, in Step S38, if the validity judgement module 41 judges that the certificate with a photograph contained in the third image has validity (Step S38, YES), the second image requesting module 21 transmits an acquisition request to the user terminal to acquire the second images such as moving or still images containing the user and the certificates with a photograph that corresponds to the first image and the third image, respectively (step S40). The step S40 is processed in the approximately same way as the above-mentioned step S14. However, the second image requesting module 21 transmits acquisition requests to the user terminal to acquire the second images corresponding to the first image and the third image, respectively.

Like the above-mentioned first certificate verification process, the second certificate verification process can skip some tasks of the above-mentioned steps S30 to S40. In this case, the tasks of the above-mentioned steps S30 to S40 may be performed for the second image like the above-mentioned first certificate verification process.

The user takes a second image to contain the user and the certificate with a photograph based on the acquisition request with the imaging device of the user terminal. The user terminal transmits the taken second image and the user's identifier to the computer 10 as the second image data.

The second image acquisition module 22 acquires the second images such as moving or still images containing the user and the certificates with a photograph that correspond to the first image and the third image, respectively (Step S41). The step S41 is processed in the same way as the above-mentioned step S15.

The analysis module 40 analyzes the second images (Step S42). The step S42 is processed in the same way as the above-mentioned step S16.

The face matching module 42 judges if the user's face and the photograph of the certificate in the second images match (Step S43). The step S43 is processed in the same way as the above-mentioned step S17.

In Step S43, if the face matching module 42 judges that the faces do not match (Step S43, NO), the second image requesting module 21 performs the above-mentioned step S40 again. At this time, the second image requesting module 21 contains the reason because the faces do not match, the resolution of the image is incorrect, or the image is unclear in the message prompting the user to take an image to contain the user and the certificate with a photograph. This judgment is made when any one or both of the second images corresponding to the first image and the third image, respectively, do not match.

On the other hand, in Step S43, if the face matching module 42 judges that the faces match (step S43, YES), the biological reaction judgement module 43 judges the presence or absence of a user's biological reaction in the second image (Step S44). The step S44 is processed in the same way as the above-mentioned step S18.

In Step S44, if the biological reaction judgement module 43 judges that there is no biological reaction (Step S44, NO), the computer 10 ends the process. This judgment is made when any one or both of the second images corresponding to the first image and the third image, respectively, have no biological reaction. The computer 10 may perform the process of the above-mentioned step S14. At this time, the second image requesting module 21 may include the message prompting the user to have a predetermined biological reaction in an acquisition request.

On the other hand, in Step S44, if the biological reaction judgement module 43 judges that there is a biological reaction (Step S44, YES), the certifying module 44 certifies that the certificate with a photograph belongs to the user (Step S45). The step S45 is processed in the same way as the above-mentioned step S19. In addition to the certifying, the certifying module 44 issues the user's identifier contained in the acquired first image data, second image data, and third image data as well as the user's face, name, date of birth, age, sex, address, etc., attached or described in the certificate with a photograph that have been identified based on the analysis result, as certified data.

The ledger recording module 23 records the verification result in a distributed ledger (Step S46). The step S46 is processed in the same way as the above-mentioned step S20.

First Provision Process

Figure 6:
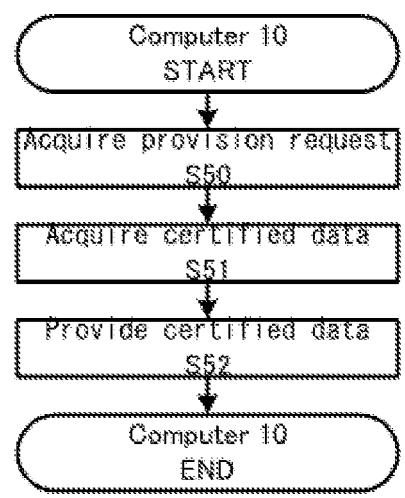
FIG. 6 is a flow chart illustrating the first provision process performed by the computer 10.

The first provision process performed by the system for verifying a certificate 1 is described below with reference to FIG. 6. FIG. 6 is a flow chart illustrating the first provision process performed by the computer 10. The tasks executed by the modules will be described below with this process.

The provision request acquisition module 26 acquires a provision request for the verification result from a third party (e.g., company, store, facility) (Step S50). In Step S50, the provision request acquisition module 26 acquires the identifier and the certified data of the target user for the provision request. Examples of the certified data include the type, the name, etc., of the above-mentioned certified data and the verification result that are required from the third party.

The provision data acquisition module 27 acquires the certified data associated with the user's identifier based on the provision request from the distributed ledger (Step S51). In Step S51, the provision data acquisition module 27 identifies the user's identifier contained in the provision request and then identifies the certified data recorded in the distributed ledger based on this identified user's identifier. The provision data acquisition module 27 acquires the identified certified data from the distributed ledger.

The data providing module 28 provides the acquired certified data to the third party (Step S52). In Step S52, the data providing module 28 provides this user's identifier and the acquired certified data to the third party. The computer 10 may receive a consideration (e.g., money, service,) for the certified data.

Second Provision Process

Figure 7:
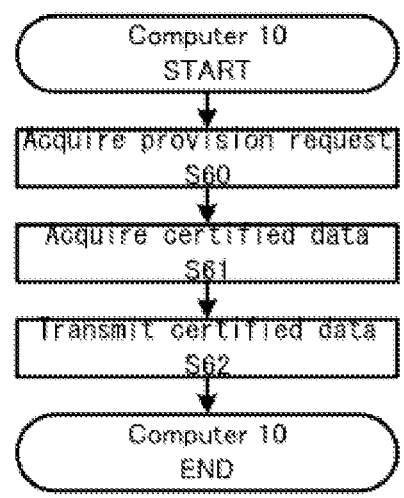
FIG. 7 is a flow chart illustrating the second provision process performed by the computer 10.

The second provision process performed by the system for verifying a certificate 1 is described below with reference to FIG. 7. FIG. 7 is a flow chart illustrating the second provision process performed by the computer 10. The tasks executed by the modules will be described below with this process.

The provision request acquisition module 26 acquires a provision request for the verification result from a user terminal (Step S60). In Step S60, the provision request acquisition module 26 acquires a provision request containing the user's identifier and the type (e.g., photograph of face, name, date of birth, age, sex, address) of the desired certified data. The user uses the user terminal to input and specify the type of the certified data that the user desires and to send the specified certified data, the user's identifier, and the identifier of the recipient's NFC tag to the computer 10 as a provision request. The provision request acquisition module 26 acquires the provision request by receiving.

The provision data acquisition module 27 acquires the certified data associated with the user's identifier based on the provision request from the distributed ledger (Step S61). In Step S61, the provision data acquisition module 27 identifies the user's identifier contained in the provision request and then identifies the certified data recorded in the distributed ledger based on this identified user's identifier. The provision data acquisition module 27 acquires the certified data specified by the user that is contained in the identified certified data from the distributed ledger. At this time, the provision data acquisition module 27 acquires the certified data that at least correspond to the photograph of face and the sex from the distributed ledger regardless of whether or not the user specifies them.

The data providing module 28 transmits the acquired certified data to the NFC tag (Step S62). In Step S62, the data providing module 28 identifies the recipient's NFC tag based on the identifier of the NFC tag that is contained in the provision request and transmits the certified data with the acquired expiration data being set to the identified NFC tag. The NFC tag receives the certified data and records the received certified data in a readable form. If the certified data exceeds its expiration date, the data providing module 28 transmits a delete command to the NFC tag to delete the certified data. The NFC tag receives the delete command and deletes the recorded certified data in response to the delete command. Alternatively, if the NFC tag judges that the expiration date has passed, the NFC tag automatically delete the certified data with this expiration date.

The user can present the desired certified data by showing the NFC tag to a shop, a facility, etc. For example, the user can present specific certified data such as photograph of face, sex, and age by using the NFC tag for a club event, drinking, etc., to decrease the need to needlessly present the private information.

Moreover, setting an expiration date for the certified data recorded in the NFC tag enables the reduction of the risk of troubles such as the loss and the thefts of the NFC tag.

To achieve the means and the functions that are described above, a computer (including a CPU, an information processor, and various terminals) reads and executes a predetermined program. For example, the program may be provided through Software as a Service (SaaS), specifically, from a computer through a network or may be provided in the form recorded in a computer-readable medium such as a flexible disk, CD (e.g., CD-ROM), or DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to those described in the embodiments of the present invention.

DESCRIPTION OF REFERENCE NUMERALS

1 System for verifying a certificate
10 Computer

What is claimed is:

1. A system that verifies that a certificate with a photograph belongs to a user, comprising:
one or more processors; and
one or more memories storing a computer program that when executed by the one or more processors cause the one or more processors to perform operations, the operations comprising:
acquiring a first image containing a picture of the certificate with the photograph of a user;
judging a validity of the first image;
acquiring a plurality of second images containing the user and the certificate with a photograph that corresponds to the first image that has the validity, wherein the user and the certificate were imaged at different angles;
judging if the user's face and the photograph of the certificate in the plurality of second images match at all the different angles; and
certifying that the certificate with a photograph belongs to the user if the user's face and the photograph of the certificate match at all the angles.

2. The system according to claim 1, wherein the operations further comprising:
recording the verification result in a distributed ledger; and
providing the recorded verification result to a third party.

3. The system according to claim 1, the operations further comprising:
judging the presence or absence of a user's biological reaction in the plurality of second images; and
certifying that the certificate with a photograph belongs to the user if the user's face and the photograph contained in the plurality of second images match in addition to the presence of a biological reaction.

4. The system according to claim 1, wherein the operations further comprising:
acquiring a third image containing a different type of the certificate with the photograph of the user; and
judging validity of the third image;
wherein the acquiring a plurality of second images containing the user and the certificate with a photograph that corresponds to the first image that has validity comprises acquiring the plurality of second images containing the user and the certificate with a photograph that corresponds to the first image that has validity and the third image that has validity.

5. A method for verifying a certificate that is executed by a system that verifies that a certificate with a photograph belongs to a user, comprising the steps of:
acquiring a first image containing a picture of the certificate with the photograph of a user;
judging a validity of the first image;
acquiring a plurality of second images containing the user and the certificate with a photograph that corresponds to the first image that has the validity, wherein the user and the certificate were imaged at different angles; and
judging if the user's face and the photograph of the certificate in the plurality of second images match at all the different angles; and
certifying that the certificate with a photograph belongs to the user if the user's face and the photograph of the certificate match at all the angles.

* * * * *